United States Patent [19]

Yamashita

[11] Patent Number: 4,924,325
[45] Date of Patent: May 8, 1990

[54] HEAD POSITION CONTROLLING METHOD

[75] Inventor: Tatsumaro Yamashita, Miyagi, Japan

[73] Assignee: Alps Electric Co., Ltd., Tokyo, Japan

[21] Appl. No.: 218,430

[22] Filed: Jul. 8, 1988

Related U.S. Application Data

[63] Continuation of Ser. No. 872,673, Jun. 10, 1986, abandoned.

[30] Foreign Application Priority Data

Jun. 11, 1985 [JP] Japan ................. 60-125235

[51] Int. Cl.⁵ ............................................ H04N 5/783
[52] U.S. Cl. .................. 360/10.2; 360/10.3; 360/70; 360/77.16
[58] Field of Search .............. 360/10.1–10.3, 360/70, 75, 77, 84, DIG. 1, 77.01, 77.12, 77.13, 77.16

[56] References Cited

U.S. PATENT DOCUMENTS

| | | | |
|---|---|---|---|
| 3,947,875 | 3/1976 | Bull | 360/31 |
| 4,251,838 | 2/1981 | Saito | 360/77 |
| 4,462,049 | 7/1984 | Heitmann | 360/10.2 |
| 4,550,349 | 10/1985 | Okuyama | 360/10.2 |
| 4,558,376 | 12/1985 | Heitmann | 360/10.2 |
| 4,595,960 | 6/1986 | Hamalainen | 360/10.2 |
| 4,603,360 | 7/1986 | Fujiki et al. | 360/84 |
| 4,630,136 | 12/1986 | Ogawa et al. | 360/10.3 |
| 4,636,874 | 1/1987 | Hoogendoorn et al. | 360/10.3 X |
| 4,685,013 | 8/1987 | Joannou et al. | 360/25 X |

Primary Examiner—Steven L. Stephan
Assistant Examiner—W. R. Young
Attorney, Agent, or Firm—Guy W. Shoup; Norman R. Klivans

[57] ABSTRACT

In a magnetic recording reproduction apparatus, electro-mechanical transducing element supply voltage to maximize output read from a standard defining tape by a rotary magnetic head is stored in a memory disecretely corresponding to position of a head in the rotational direction per each mode such as still reproduction, slow reproduction or speed search, and the supply voltage corresponding to the position of the rotary magnetic head in the rotational direction is read from the memory during the use state, and the electromechanical transducing element is supplied with the supply voltage read from the memory and the position of the rotary magnetic head in the rotational axis direction is controlled.

2 Claims, 5 Drawing Sheets

FIG. 1
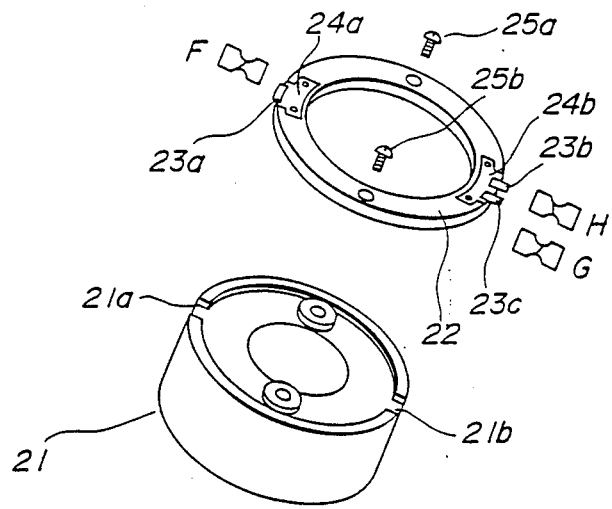
FIG. 2
| MODE | NORMAL | HALF SPEED |
|---|---|---|
| RECORDING | F − H | F − H |
| REPRODUCTION | F − H | F − H |
| STILL | F − G | F − G |
| SLOW | F − G − H | F − G − H |
| SPEED SEARCH | F − H − G | F − H − G |
FIG. 3
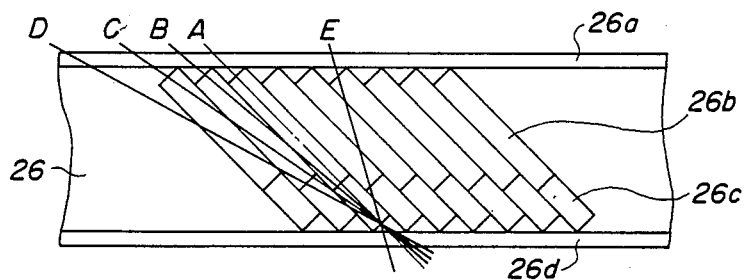

FIG. 8(a)
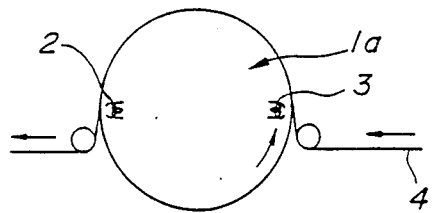
FIG. 8(b)
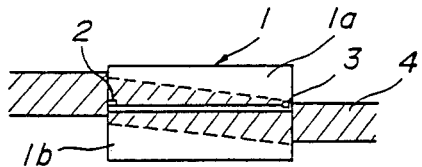
FIG. 9
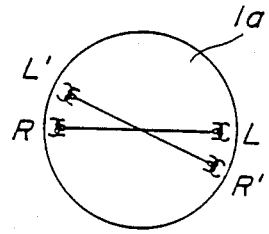
FIG. 11
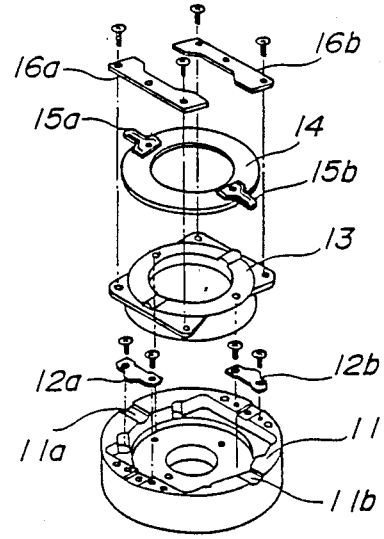
FIG. 10
| MODE | NORMAL | HALF SPEED |
|---|---|---|
| RECORDING | R' − L' | R − L |
| REPRODUCTION | R' − L' | R − L |
| STILL | L − L' | R − R' |
| SLOW | L − L' − R | R − R' − L |
| SPEED SEARCH | R − R' − L − L' | R − L |

HEAD POSITION CONTROLLING METHOD

This application is a continuation of application Ser. No. 872,673, filed June 10, 1986, now abandoned.

BACKGROUND OF THE INVENTION

1. Field of the Invention

The present invention relates to a head position controlling method in a magnetic recording reproduction apparatus such as VTR, and more particularly to a head position controlling method wherein high picture quality is obtained in various modes.

2. Description of the Prior Art

In a VTR as shown in FIG. 8, a magnetic tape guide drum 1 has a rotary drum (upper drum) 1a, and two recording reproduction heads (video heads) 2, 3 are installed on the rotary drum 1a and spaced fron each other by 180°. A magnetic tape 4 is traveled in contacting obliquely with cylindrical surface of the magnetic tape guide drum 1, thereby traveling track of each head on the magnetic tape (called "video track") is inclined with respect to the tape longitudinal direction and the traveling track of each head is shifted in sequence by one track pitch. Thus the two heads 2, 3 are changed and used alternately, and signals are recorded to the magnetic tape 4 or read from the magnetic tape 4 and reproduced. In other words, the two heads 2, 3 are scanned alternately as if moved in threadably motion on the surface of the magnetic tape traveling in wound state on the cylindrical surface of the magnetic tape guide drum 1, thereby signals are recorded in sequence to the magnetic tape or read from the magnetic tape. In the magnetic tape guide drum 1, numeral 1b designates a stationary lower drum.

In such VTR, accuracy of the tape guide (lead) of the lower drum 1b, installation accuracy of the video heads (rotary magnetic heads) 2, 3, vertical accuracy of the rotary shaft and the like are controlled strictly, thereby the track format with the track pitch of about 10~20 μm is attained and the picture image with assured quality can be displayed on a cathode ray tube of a television.

In recent years, not only ordinary reproduction but also special reproduction such as still reproduction, slow reproduction or speed search must be performed at high picture quality. In other words, variable speed reproduction is required at noiseless state and high picture quality. In order to satisfy such requirement, the reproduction output must be made maximum at various modes such as ordinary reproduction, still reproduction, slow reproduction, speed search or the like.

Consequently, one method is proposed wherein a special reproduction head is newly installed in addition to an ordinary recording reproduction head so that the head constitution is made 3~5 heads for example, and the tape feeding is controlled so as to reduce the noise. FIG. 9 is a diagram illustrating such head constitution in the prior art, and FIG. 10 is a correspondence table between modes and used heads. Four heads R, L; R', L' are installed to the rotary drum 1a. According to such method, the noiseless state is attained in combination of heads suitable to various modes, but increase of the heads in number is inevitable.

Another method is proposed wherein special reproduction is performed at high picture quality using a piezoelectric element. FIG. 11 is an exploded perspective view of a rotary head using such piezoelectric element. In FIG. 11, numeral 11 designates a rotary drum (upper drum). Numerals 12a, 12b designate first and second video heads for recording reproduction respectively fixed using screws to grooves 11a, 11b formed on the upper drum 11 and spaced from each other by 180°. Numeral 13 designates a piezoelectric element mounting base, and numeral 14 a disc-like piezoelectric element of sticking type having a circular hole at the center. Numerals 15a, 15b designate third and fourth video heads mounted on the free end of the piezoelectric element 14 and spaced from each other by 180°, and numerals 16a, 16b piezoelectric element pressure plates. In order to perform field reproduction without picture image fluttering, the rotary head is constituted by four heads. Among the four heads, the first and second video heads 12a, 12b are those for recording and normal reproduction and different from each other in azimuth angle, and residual third and fourth video heads 15a, 15b are those to be used exclusively for variable speed reproduction and displaced at the same azimuth angle. When prescribed voltage is applied to the piezoelectric element 14 by some means (not shown), the third and fourth video heads 15a, 15b are moved up and down in the rotational axis direction thereby the height H (refer to FIG. 12) can be adjusted.

If the position of the video head in the rotational axis direction (height H in FIG. 12) is varied, position of the scanning track on the magnetic tape by the video heads can be varied and the reproduction output can be controlled. Accordingly, in conventional method using a piezoelectric element, supply voltage applied to the piezoelectric element is controlled and height H is suitably varied so that the reproduction output in each mode becomes large.

The piezoelectric element has hysteresis α as shown in FIG. 13. Even if height H (refer to FIG. 12) is set at the initial stage, the initial height H cannot be restored sfter the current flowing Existence of the hysteresis α has no problem during the reproduction, because the piezoelectric element is used at current flowing state. However, during the recording, since the track is drawn in the state that the height H is shifted by α, recording at a definite format cannot be performed. Consequently, in conventional method using a piezoelectric element, since first and second video heads 12a, 12b in fixed state must be installed for the recording, problem exists in that the number of heads becomes large.

Moreover, conventional method has problem in determining voltage to be supplied to the piezoelectric element, snd must be improved to obtain accurate recording pattern on the format.

SUMMARY OF THE INVENTION

In view of above-mentioned disadvantages in the prior art, an object of the invention is to provide a head position controlling method in a magnetic recording reproduction apparatus, wherein the number of used heads may be decreased, recording pattern is obtained at high fidelity to a format, variable speed reproduction is performed so that the reproduction output becomes maximum, and accuracy in machining and assembling of components can be relieved.

The invention consists in a head position controlling method in a magnetic recording reproduction apparatus, wherein a tape is traveled at installed state on a magnetic tape guide drum enclosing a rotary magnetic head, and position of the rotary magnetic head in the rotational axis direction is controlled by an electro-mechanical transducing element.

The head position controlling method comprises steps of (a) determining supply voltage to an electro-mechanical transducing element based on reproduction output of a rotary magnetic head read from a standard defining tape per each mode, and storing the supply voltage to a memory discretely corresponding to position of the head in the rotational axis direction;

(b) reading the supply voltage corresponding to the position of the rotary magnetic head from the memory during the use state; and (c) supplying the electro-mechanical transducing element with the supply voltage read from the memory, and controlling the position of the rotary magnetic head in the rotational axis direction.

In order to perform not only ordinary reproduction but also special reproduction (variable speed reproduction) such as still reproduction, slow reproduction or speed search at noiseless state and high picture quality, the reproduction output may be made maximum in various reproduction modes.

Consequently, in the invention, piezoelectric element supply voltage to maximize output read from a standard defining tape is determined discretely corresponding to position of the head in the rotational axis direction and stored in a memory per each reproduction mode. During the actual use state, the supply voltage corresponding to the position of the rotary magnetic head in the rotational axis direction is read from the memory, and the piezoelectric element is supplied with the supply voltage read from the memory and the position of the rotary magnetic head in the rotational axis direction is controlled thereby the reproduction output becomes maximum.

BRIEF DESCRIPTION OF THE DRAWINGS

FIG. 1 is an exploded perspective view of a rotary drum used in the invention;

FIG. 2 is a diagram illustrating correspondence relation between modes and used heads;

FIG. 3 is a tape pattern diagram;

FIG. 8 (a, b) is a schematic diagram illustrating VTR;

FIG. 9 is a head constitution diagram to obtain high picture quality;

FIG. 10 is a diagram illustrating relation between modes and used heads in the head constitution shown in FIG. 9;

FIG. 11 is an exploded perspective view of a rotary head using a piezo-electric element in the prior art;

DESCRIPTION OF THE PREFERRED EMBODIMENTS

Figure 4:
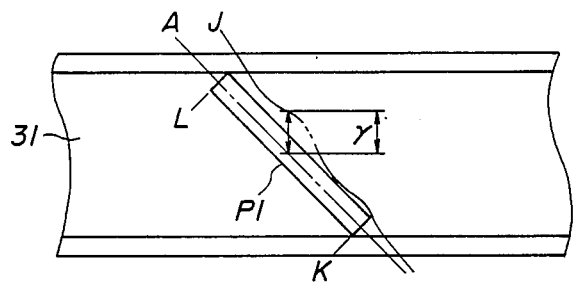
FIG. 4 is a diagram illustrating actual head track and ideal head track.

FIG. 1 is an exploded perspective view of a rotary drum (upper drum) to be used in the invention. In FIG. 1, reference numeral 21 designates a rotary drum with grooves 21a, 21b cut on outer circumferential portion and spaced from each other by 180°. Numeral 22 designates a piezoelectric element of sticking type. Video heads 23a, 23b for recording/reproduction and a video head 23c used exclusively for reproduction are fixed to the piezoelectric element 22 by head base plates 24a, 24b respectively.

Figure 12:
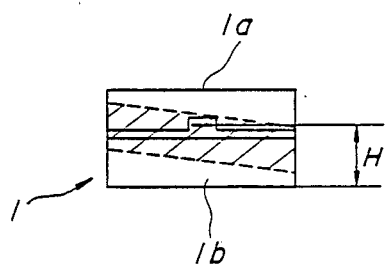
FIG. 12 is a diagram illustrating head height.
Figure 13:
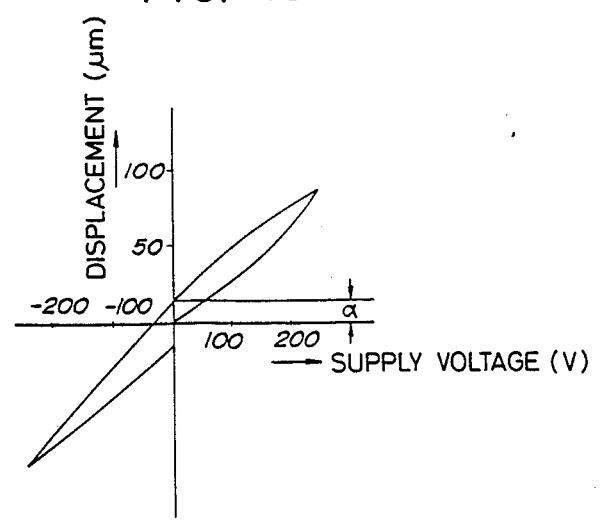
FIG. 13 is a diagram illustrating hysteresis of a piezoelectric element.

The video heads 23a, 23b are fixed on free end of outer circumference of the piezoelectric element 22 and spaced from each other by 180° into azimuth constitution. The video head 23c is arranged adjacent to the second video head 23b into inverse azimuth constitution with respect to the video head 23b. The piezoelectric element 22 is fixed to mounting portions 21c, 21d of the rotary drum 21 by screws 25a, 25b so that the video head 23a and the video heads 23b, 23c are disposed in floated state respectively on grooves 21a and 21b of the rotary drum 21. The rotary head as a whole is installed to be higher than conventional head height H (refer to FIG. 12) by $\beta$ or lower than that by $\alpha$ ($>\beta$). According to the rotary head, recording and variable speed reproduction can be performed variously in each mode by combination of heads shown in FIG. 2.

In order to record a prescribed tape pattern (FIG. 3), in usual, the head height H, the vertical height of the rotary shaft of the rotary drum 21, the tape guide (lead) of the lower drum or the like must be controlled at accuracy of order of several $\mu$m. However, this control can be performed in relatively rough constitution, if method as hereinafter described is adopted. In FIG. 3, numeral 26 designates a magnetic tape, numeral 26a a queue track, numeral 26b a video track, numeral 26c a PCM track, and numeral 26d an AUX track. Symbol A designates a head track at standard reproduction state, symbol B a head track at slow reproduction state, symbol C a head track at still reproduction state, symbol D a head track at rewind search state, and symbol E a head track at speed search state.

As above described, the video heads 23a~23c are installed so that the whole device is elevated when the piezoelectric element 22 is not energized. Moreover, since the element relating to the linearity is assembled roughly, if pattern to be traced by the video head is made Pl in FIG. 4, the actual head track J traces position shifted from the ideal trace A by $\gamma$, thereby reproduction at high picture quality cannot be performed.

Consequently, the invention comprises steps of (a) preparing a recorded tape having very small shift from a specified tape format (called "standard defining tape");

(b) determining piezoelectric element supply voltage to maximize output read from the standard defining tape (to make $\gamma=0$) corresponding to plural positions of the head in the rotational direction, and storing the supply voltage in a memory;

(c) reading the supply voltage corresponding to the position of the rotary magnetic head in the rotational direction during the actual reproduction; and (d) supplying the piezoelectric element with the supply voltage read from the memory, and controlling the position of the rotary magnetic head in the rotational axis direction so that the reproduction output becomes maximum, i.e., the actual head track coincides with the ideal track.

Figure 5:
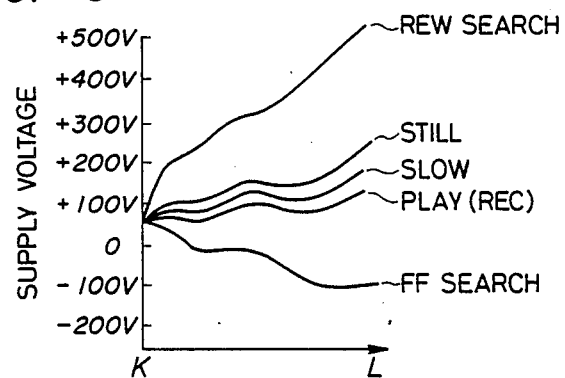
FIG. 5 is a diagram illustrating correspondence relation between head position in the rotational direction and piezo-electric element supply voltage.

Further, piezoelectric element supply voltage at discrete position in the rotational direction (discrete position of track from point K to point L as shown in FIG. 4) is determined so that the reproduction output becomes maximum per each mode, and the supply voltage is stored in the memory. FIG. 5 is a diagram illustrating correspondence relation between discrete position (phase) per each mode and piezoelectric element supply voltage.

Figure 6:
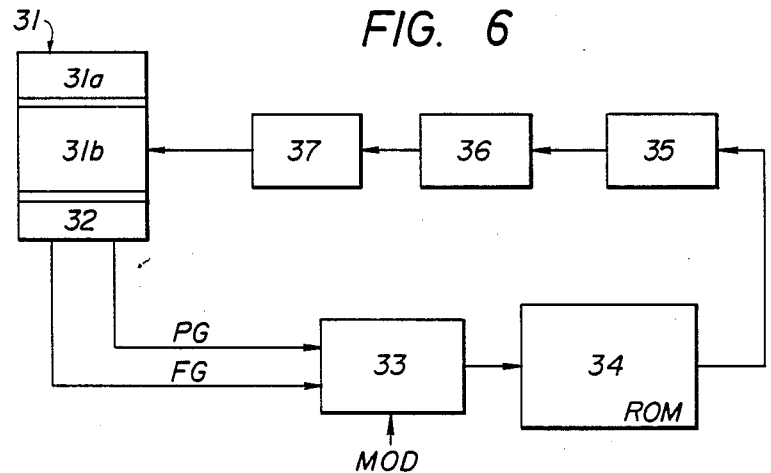
FIG. 6 is a block diagram of an apparatus to achieve a head element controlling method of the invention.

FIG. 6 is a block diagram of an apparatus to achieve a head position controlling method according to the invention.

In FIG. 6, numeral 31 designates a magnetic tape guide drum having a rotary drum (upper drum) 31a and a stationary lower drum 31b. Numeral 32 designates a motor to rotate the rotary drum 31a at constant speed. A pulse generator (not shown) generates one rotational pulse PG per one rotation of the rotary drum and N (for example, 24) pulses FG per one rotation of the rotary drum. Numeral 33 designates an address generator to generate N (=24) addresses per one rotation of the rotary drum 31a in cyclic relation per each mode. In other words, the address generator 33 comprises a counter which counts the pulse FG and is reset by one rotational pulse PG and an address conversion table which converts count value of the counter into a prescribed memory address corresponding to the selected mode, and generates 24 addresses per one rotation in cyclic relation corresponding to the selected mode and the position of the rotary drum 31a in the rotational direction. Numeral 34 designates an ROM which stores supply voltage to the piezoelectric element so that the reproduction output becomes maximum. In other words, according to supply voltage determining processing as hereinafter described, the piezoelectric electric element supply voltage is determined so that the reproduction output becomes maximum at position of the rotary head in the rotational direction (24 positions to generate pulse FG) per each mode, and the supply voltage value is stored in the ROM 34. Numeral 35 designates a DA converter which converts voltage value (digital) read from the ROM 34 into analog value corresponding to the position of the rotary drum 31a in the rotational direction. Numeral 36 designates a low pass filter, and numeral 37 an actuator which applies voltage to the piezoelectric element.

If mode such as recording, reproduction, still reproduction or slow reproduction is selected, mode signal MOD is applied to the address generator 33, which generates address corresponding to the selected mode and the present position of the rotary drum 31a, i.e., the position of the head in the rotational direction. Thus the supply voltage corresponding to the mode and the head position is inputted from the ROM 34 to the DA converter 35. The supply voltage is subjected to DA conversion in the DA converter 35, and the converted voltage is smoothed by the low pass filter 36 and inputted to the actuator 37. The actuator 37 applies the inputted supply voltage to the piezoelectric element 22 (FIG. 1), and moves the head to a prescribed position in the rotational axis direction so that the reproduction output becomes maximum.

In the subsequent operation, every time the rotary drum 1a is rotated and the pulse FG is generated, the address generator 33 generates a prescribed address and the position of the head is controlled.

Figure 7:
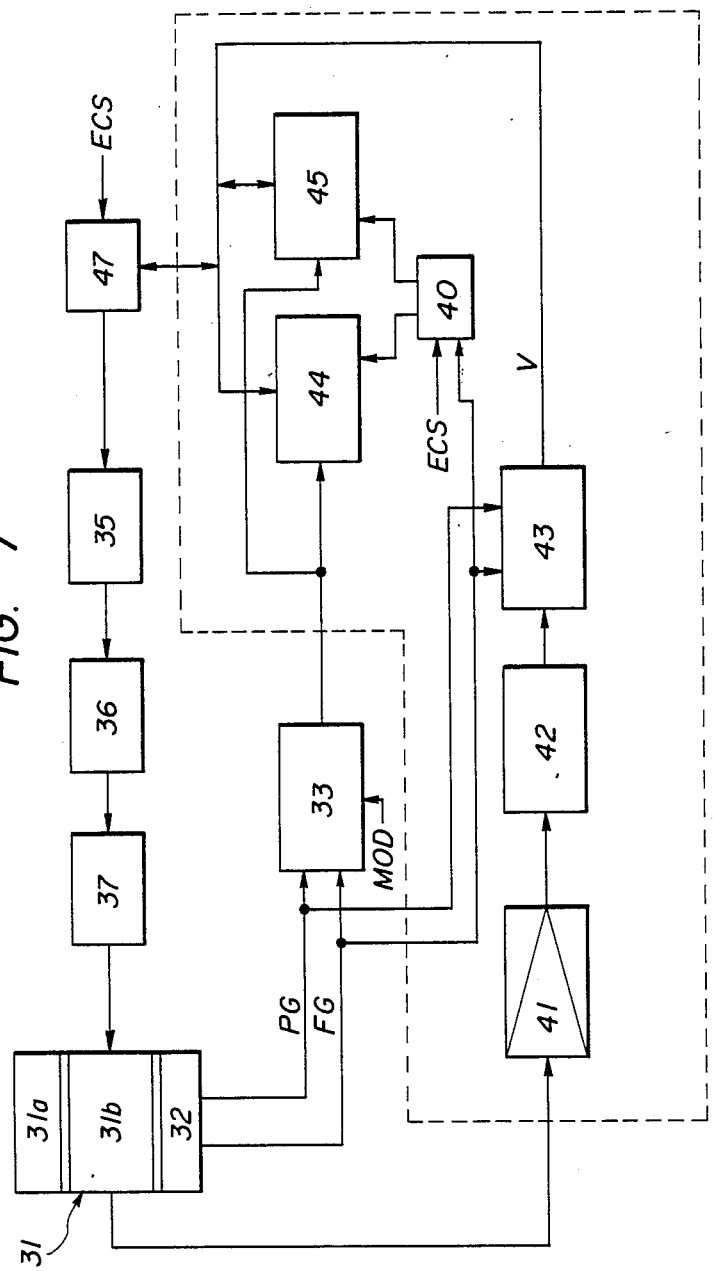
FIG. 7 is a block diagram of an apparatus to perform supply voltage determining processing to the piezoelectric element so as to maximize reproduction output.

FIG. 7 is a block diagram of an apparatus to determine the supply voltage value to the piezoelectric element so that the reproduction output becomes maximum. Parts in FIG. 7 similar to those in FIG. 6 are designated by the same reference numerals. Parts shown by broken line in FIG. 7 are those to determine the supply voltage.

In FIG. 7, numeral 41 designates an amplifier to amplify the reproduction signal read by the head, numeral 42 an envelope detector to generate envelope of the amplifier output, and numeral 43 to a supply voltage determining member which determines the supply voltage value V to be applied to the piezoelectric element based on difference between an actual envelope value and an envelope value when ideally traced (already known). Numeral 44 designates a first RAM, and numeral 45 a second RAM. Each address of the first RAM 44 previously stores the supply voltage suitable to be applied to the piezoelectric element 22 (FIG. 1) corresponding to the position of the rotary drum 31a in the rotational direction (24 positions) per each mode. In the determining processing of the supply voltage suitable to be applied to the piezoelectric element, the digital supply voltage value V outputted from the supply voltage determining member 43 is stored alternately to the first and second RAMs 44, 45. Numeral 40 designates a selector which generates write enable signal WE according to generation of the pulse PG in the supply voltage determining processing (external changing signal ECS="1"). The write enable signal WE is inputted alternately to the first RAM 44 and the second RAM 45 per one rotation. Numeral 47 designates a selector which reads the supply voltage alternately from the first RAM 44 and the second RAM 45 per one rotation of the rotary drum 31a in the supply voltage determining processing (ECS="1").

If the normal tape is assembled to the VTR and then a prescribed reproduction mode is selected, address signal is generated corresponding to the mode selected from the address generator 33 and the present position of the rotary drum 31a. The selector 47 reads the supply voltage from the storage area of the first RAM 44 designated by the address and inputs the supply voltage to the DA converter 35. The DA converter 35 converts the supply voltage into analog value, the low pass filter 36 smoothes the DA converter output, and the actuator 37 supplies the inputted voltage to the piezoelectric element and controls the head position.

In concurrence to the above processing, the reproduction signal read by the head is amplified by the amplifier 41 and inputted to the envelope detector 42. The envelope detector 42 inputs envelope waveform of the reproduction signal into the supply voltage determining member 43. The supply voltage determining member 43 performs prescribed processing using the inputted envelope waveform signal and operates the new supply voltage and outputs it. For example, the supply voltage determining member 43 compares the actual envelope value with the ideal envelope value, and generates the new supply voltage in digital value based on the difference. Since the selector 40 generates the write enable signal WE first to the second RAM 45, the supply voltage value V in digital value outputted from the supply voltage generating member 43 is written to a prescribed address of the second RAM 45 designated by the address generator 33.

In subsequent operation, every time the rotary drum 31*a* is rotated and the pulse PG is generated, above processing is repeated. If one rotational pulse PG is generated, the selector 47 reads the supply voltage value from the second RAM 45 and inputs it to the DA converter 35 until next one rotational pulse is generated. The selector 40 inputs the write enable signal WE to the first RAM 44 and stores the supply voltage value V outputted from the supply voltage determining member 43. Every time one rotational pulse is generated subsequently, the RAM to read the supply voltage and the RAM to write the supply voltage are changed. Above processing is repeated until the maximum reproduction output is finally obtained, that is, until value of $\gamma$ shown in FIG. 4 becomes zero.

If the supply voltage value is determined to each and then the supply voltage data stored in the RAM is written in the ROM, the determining processing of the supply voltage to maximize the reproduction output is finished. And then the ROM in which the supply voltage is written may be assembled to the VTR.

Although the head is installed to the piezoelectric element in the above embodiment, the invention is not limited to the piezoelectric element but any electro-mechanical transducing element to convert the electric energy into the mechanical energy may be used.

According to the invention, electro-mechanical transducing element supply voltage to maximize output read from the standard defining tape by the rotary magnetic head is stored in the memory discretely per each mode corresponding to the position of the head in the rotational direction, the supply voltage corresponding to the position of the rotary magnetic head in the rotational direction is read from the memory during the use state, and the electro-mechanical transducing element is supplied with the supply voltage read from the memory and the position of the rotary magnetic head in the rotational axis direction is controlled. Thus the invention in above-mentioned constitution has effects in that the number of used heads may be decreased, the recording pattern having high fidelity to the format can be obtained, the variable speed reproduction is performed so that the reproduction output becomes maximum, and accuracy in machining and assembling of components may be relieved.

What is claimed is:

1. A head position controlling method for a magnet recording and reproducing apparatus, comprising the steps of:

providing a rotary drum supporting exactly three magnetic heads on its periphery which are rotatable on an axis of the drum in contact with a travelling magnetic tape;

providing an electro-mechanical transducing element for deflecting said magnetic heads to different axial positions along said axis in conjunction with rotation of said drum in response to control voltage signals supplied to said transducer element, for optimal axial positioning of said heads for tracking the travelling magnetic tape in each of a plurality of different modes for the apparatus, including a recording mode and a reproducing mode;

determining during assembly the optimal control voltage signals to be supplied to said transducing element for deflecting said heads in each of the plurality of modes of the apparatus by using a standard defining tape having a specified track format recorded thereon to locate optimal axial positions for the magnetic heads at different rotational phase positions thereof in each of said modes, and storing the optimal control voltage signals corresponding thereto in a memory for subsequent actual use;

selecting an optional mode for actual use of the apparatus and reading the stored optimal control voltage signals corresponding thereto from said memory;

supplying said optimal control voltage signals to said transducing element to control the axial positions of said magnetic heads in the selected operation mode;

using only two of said magnetic heads for recording at both a normal speed and a speed one-half of the normal speed; and using the third of said magnetic heads only for reproducing at speeds other than a speed used for recording.

2. A head position controlling method for a magnetic recording and reproducing apparatus according to claim 1, wherein said optimal control voltage signal determining step includes determining for one track of a plurality of tracks on said travelling magnetic tape the control voltage signals for positioning said magnetic heads in correspondence with the axial positions at which a maximum output is read by said heads from said standard defining tape.

* * * * *

UNITED STATES PATENT AND TRADEMARK OFFICE
CERTIFICATE OF CORRECTION

PATENT NO. : 4,924,325
DATED : May 8, 1990
INVENTOR(S) : Tatsumaro Yamashita It is certified that error appears in the above-identified patent and that said Letters Patent is hereby corrected as shown below:

Column 8, line 1 (Claim 1), "magnet" should read --magnetic--.

Signed and Sealed this

Sixth Day of July, 1993

*Attest:*

MICHAEL K. KIRK

*Attesting Officer*     Acting Commissioner of Patents and Trademarks